United States Patent

Fetcenko et al.

[11] Patent Number: 5,536,591
[45] Date of Patent: Jul. 16, 1996

[54] ELECTROCHEMICAL HYDROGEN STORAGE ALLOYS FOR NICKEL METAL HYDRIDE BATTERIES

[75] Inventors: Michael A. Fetcenko, Rochester Hills; Stanford R. Ovshinsky, Bloomfield Hills; Benjamin S. Chao, Troy; Benjamin Reichman, West Bloomfield, all of Mich.

[73] Assignee: Ovonic Battery Company, Inc., Troy, Mich.

[21] Appl. No.: 423,072

[22] Filed: Apr. 17, 1995

Related U.S. Application Data

[63] Continuation-in-part of Ser. No. 136,066, Oct. 14, 1993, Pat. No. 5,407,761, which is a continuation-in-part of Ser. No. 934,976, Aug. 25, 1992, Pat. No. 5,277,999, which is a continuation-in-part of Ser. No. 746,015, Aug. 14, 1991, Pat. No. 5,238,756, which is a continuation-in-part of Ser. No. 515,020, Apr. 26, 1990, Pat. No. 5,104,617.

[51] Int. Cl.$^6$ .................................................. H01M 4/38
[52] U.S. Cl. .................... 429/59; 429/101; 420/584.1; 420/586; 420/586.1; 420/900
[58] Field of Search .......................... 429/57, 59, 101; 420/584.1, 586, 586.1, 900

[56] References Cited

U.S. PATENT DOCUMENTS

| 4,728,586 | 3/1988 | Venkatesan et al. | 429/94 |
| 4,849,205 | 7/1989 | Hong | 423/644 |
| 5,407,761 | 4/1995 | Ovshinsky et al. | 429/59 |

*Primary Examiner*—Stephen Kalafut
*Attorney, Agent, or Firm*—Marc J. Luddy; Marvin S. Siskind; David W. Schumaker

[57] ABSTRACT

A disordered electrochemical hydrogen storage alloy comprising:

$$(\text{Base Alloy})_a \text{Co}_b \text{Mn}_c \text{Fe}_d \text{Sn}_e$$

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and $a+b+c+d+e=100$ atomic percent.

43 Claims, 1 Drawing Sheet

Fig. 1

ELECTROCHEMICAL HYDROGEN STORAGE ALLOYS FOR NICKEL METAL HYDRIDE BATTERIES

CONTINUING INFORMATION

The present invention is a continuation in part of U.S. patent application Ser. No. 08/136,066 filed Oct. 14, 1993 now U.S. Pat. No. 5,467,761. U.S. patent application Ser. No. 08/136,066 is a continuation in part of U.S. Pat. No. 5,277,999 (filed as U.S. patent application Ser. No. 07/934,976 on Aug. 25, 1992). U.S. Pat. No. 5,277,999 is a continuation in part of U.S. Pat. No. 5,238,756 (filed as U.S. patent application Ser. No. 07/746,015 on Aug. 14, 1991). U.S. Pat. No. 5,238,756 is a continuation in part of U.S. Pat. No. 5,104,617 (filed as U.S. patent application Ser. No. 07/515,020 on Apr. 26, 1990).

FIELD OF THE INVENTION

The present invention relates to electrochemical hydrogen storage alloys and rechargeable electrochemical cells using these alloys.

More particularly, the invention relates to rechargeable cells and batteries having negative electrodes formed of multicomponent, electrochemical hydrogen storage alloys. Cells that incorporate these alloys have performance characteristics, such as energy density, charge retention, cycle life, and low temperature performance that are significantly improved over known rechargeable cells using hydrogen storage alloys. The present invention also describes unique alloys that utilize significantly reduced amounts of Co without a loss in performance.

BACKGROUND OF THE INVENTION

Rechargeable cells that use a nickel hydroxide positive electrode and a metal hydride forming hydrogen storage negative electrode ("metal hydride cells") are known in art.

When an electrical potential is applied between the electrolyte and a metal hydride electrode in a metal hydride cell, the negative electrode material (M) is charged by the electrochemical absorption of hydrogen and the electrochemical evolution of a hydroxyl ion; upon discharge, the stored hydrogen is released to form a water molecule and evolve an electron:

The reactions that take place at the positive electrode of a nickel metal hydride cell are also reversible. Most metal hydride cells use a nickel hydroxide positive electrode. The following charge and discharge reactions take place at a nickel hydroxide positive electrode:

In a metal hydride cell having a nickel hydroxide positive electrode and a hydrogen storage negative electrode, the electrodes are typically separated by a non-woven, felted, nylon or polypropylene separator. The electrolyte is usually an alkaline aqueous electrolyte, for example, 20 to 45 weight percent potassium hydroxide.

The first hydrogen storage alloys to be investigated as battery electrode materials were TiNi and LaNi$_5$. Many years were spent in studying these simple binary intermetallics because they were known to have the proper hydrogen bond strength for use in electrochemical applications. Despite extensive efforts, however, researchers found these intermetallics to be extremely unstable and of marginal electrochemical value due to a variety of deleterious effects such as slow discharge, oxidation, corrosion, poor kinetics, and poor catalysis. These simple alloys for battery applications reflects the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and LaNi$_5$ systems.

The modification of TiNi and LaNi$_5$ was initiated by Stanford R. Ovshinsky at Energy Conversion Devices (ECD) of Troy, Mich. Ovshinsky and his team at ECD showed that reliance on simple, relatively pure compounds was a major shortcoming of the prior art. Prior work had determined that catalytic action depends on surface reactions at sites of irregularities in the crystal structure. Relatively pure compounds were found to have a relatively low density of hydrogen storage sites, and the type of sites available occurred accidently and were not designed into the bulk of the material. Thus, the efficiency of the storage of hydrogen and the subsequent release of hydrogen was determined to be substantially less than that which would be possible if a greater number and variety of active sites were available.

Ovshinsky had previously found that the number of surface sites could be increased significantly by making an amorphous film that resembled the surface of the desired relatively pure materials. As Ovshinsky explained in *Principles and Applications of Amorphicity, Structural Change, and Optical Information Encoding*, 42 *Journal De Physique* at C4-1096 (October 1981):

> Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . . .

Once amorphicity was understood as a means of introducing surface sites in a film, it was possible to produce "disorder" in a planned manner not only in amorphous materials, but also in crystalline materials; "disorder" that takes into account the entire spectrum of local order effects such as porosity, topology, crystallites, characteristics of sites, and distances between sites. Thus, rather than searching for material modifications that would yield ordered materials having a maximum number of accidently occurring surface irregularities, Ovshinsky's team at ECD began constructing "disordered" materials where the desired irregularities could be tailor made. See, U.S. Pat. No. 4,623,597, the disclosure of which is incorporated by reference.

The term "disordered," as used herein corresponds to the meaning of the term as used in the literature, such as the following:

A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . .

S. R. Ovshinsky, *The Shape of Disorder*, 32 Journal of Non-Crystalline Solids at 22 (1979) (emphasis added).

The "short-range order" of these disordered materials are further explained by Ovshinsky in *The Chemical Basis of Amorphicity: Structure and Function*, 26:8–9 Rev. Roum. Phys. at 893–903 (1981):

[S]hort-range order is not conserved . . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena.

In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to simple, ordered crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Based on the pioneering principles described above, some of the most efficient electrochemical hydrogen storage materials were formulated. These included modified $LaNi_5$ type as well as the TiVZrNi type active materials. Ti—V—Zr—Ni type active materials are disclosed in U.S. Pat. No. 4,551,400 ("the '400 Patent"), the disclosure of which are incorporated by reference. These materials reversibly form hydrides in order to store hydrogen. All the materials used in the '400 Patent utilize a generic Ti—V—Ni composition, where at least Ti, V, and Ni are present with at least one or more of Cr, Zr, and Al. The materials of the '400 Patent are multiphase materials, which may contain, but are not limited to, one or more TiVZrNi type phases with a $C_{14}$ and $C_{15}$ type crystal structure. The following formulae are specifically disclosed in the '400 Patent:

$$(TiV_{2-x}Ni_x)_{1-y}M_y$$

where x is between 0.2 and 1.0; y is between 0.0 and 0.2; and M=Al or Zr;

$$Ti_{2-x}Zr_xV_{4-y}Ni_y$$

where Zr is partially substituted for Ti; x is between 0.0 and 1.5; and y is between 0.6 and 3.5; and

$$Ti_{1-x}Cr_xV_{2-y}Ni_y$$

where Cr is partially substituted for Ti; x is between 0.0 and 0.75; and y is between 0.2 and 1.0.

Other Ti—V—Zr—Ni alloys may also be used for a rechargeable hydrogen storage negative electrode. One such family of materials are those described in U.S. Pat. No. 4,728,586 ("the '586 Patent") to Venkatesan, Reichman, and Fetcenko for *Enhanced Charge Retention Electrochemical Hydrogen Storage Alloys and an Enhanced Charge Retention Electrochemical Cell*, the disclosure of which is incorporated by reference. The '586 Patent describes a specific sub-class of these Ti—V—Ni—Zr alloys comprising Ti, V, Zr, Ni, and a fifth component, Cr.

In a particularly preferred exemplification of the '586 Patent, the alloy has the composition where x is from 0.00 to 1.5, y is from 0.6 to 3.5, and z is an effective amount less than 0.20. These alloys may be viewed stoichiometrically as comprising 80 atomic percent of a V—Ti—Zr—Ni moiety and up to 20 atomic percent Cr, where the ratio of (Ti+Zr+Cr+optional modifiers) to (Ni+V+optional modifiers) is between 0.40 to 0.67. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

The V—Ti—Zr—Ni family of alloys described in the '586 Patent has an inherently higher discharge rate capability than previously described alloys. This is the result of substantially higher surface areas at the metal/electrolyte interface for electrodes made from the V—Ti—Zr—Ni materials. The surface roughness factor (total surface area divided by geometric surface area) of V—Ti—Zr—Ni alloys is about 10,000. This value indicates a very high surface area and is supported by the inherently high rate capability of these materials.

The characteristic surface roughness of the metal/electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. These microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface composition and particle size. This phenomenon is described in U.S. Pat. No. 4,716,088. This steady state surface composition is characterized by a relatively high concentration of metallic nickel. These observations are consistent with a relatively high rate of removal through precipitation of the oxides of titanium and zirconium from the surface and a much lower rate of nickel solubilization, providing a degree of porosity to the surface. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

In contrast to the Ti—V—Zr—Ni based alloys described above, alloys of the modified LaNi$_5$ type have generally been considered "ordered" materials that have a different chemistry and microstructure, and exhibit different electrochemical characteristics compared to the Ti—V—Zr—Ni alloys. However, analysis reveals while the early unmodified LaNi$_5$ type alloys may have been ordered materials, the more recently developed, highly modified LaNi$_5$ alloys are not. The performance of the early ordered LaNi$_5$ materials was poor. However, the modified LaNi$_5$ alloys presently in use have a high degree of modification (that is as the number and amount of elemental modifiers has increased) and the performance of these alloys has improved significantly. This is due to the disorder contributed by the modifiers as well as their electrical and chemical properties. This evolution of modified LaNi$_5$ type alloys from a specific class of "ordered" materials to the current multicomponent, multiphase "disordered" alloys that are now very similar to Ti—V—Zr—Ni alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688; (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference.)

Simply stated, in modified LaNi$_5$ type alloys, like Ti—V—Zr—Ni type alloys, as the degree of modification increases, the role of the initially ordered base alloy becomes of secondary importance compared to the properties and disorder attributable to the particular modifiers. In addition, analysis of current multiple component modified LaNi$_5$ type alloys indicates that these alloys are modified following the guidelines established for TiVZrNi type systems. Highly modified modified LaNi$_5$ type alloys are identical to TiVZrNi type alloys in that both are disordered materials characterized by multiple-components and multiple phases. Thus, there no longer exists any significant distinction between these two types of multicomponent, multiphase alloys.

DEFICIENCIES OF THE PRIOR ART

While prior art hydrogen storage alloys frequently incorporate various individual modifiers and combinations of modifiers to enhance their performance characteristics, there is no clear teaching of the role of any individual modifier, the interaction of any modifier with other components of the alloy, or the effects of any modifier on specific operational parameters. Because highly modified LaNi$_5$ alloys were being analyzed from within the context of well ordered crystalline materials, the effect of these modifiers, in particular, was not clearly understood.

Prior art hydrogen storage alloys have generally been able to provide improved performance attributes, such as cycle life, rate of discharge, discharge voltage, polarization, self discharge, low temperature capacity, and low temperature voltage. However, prior art alloys have yielded cells that exhibit a quantitative improvement in one or two performance characteristic at the expense of a quantitative reduction in other performance characteristics. Often, the outstanding performance characteristics of these cells are sometimes only slightly better than comparable characteristics of other kinds of cells such as NiCds. Thus, all of the cells produced from prior art alloys were special purpose cells whose performance characteristics, both good and bad represented an engineering compromise and, therefore, were closely tailored to the intended use of the cell.

SUMMARY OF THE INVENTION

One object of the present invention is hydrogen storage alloys that exhibit improved capacity.

These and other objects of the present invention are satisfied by the following electrochemical hydrogen storage alloys and methods for forming such alloys:

A disordered electrochemical hydrogen storage alloy comprising:

where said Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

An electrochemical hydrogen storage alloy having an enriched Ni alloy surface at the oxide interface.

A method of forming an electrochemical hydrogen storage alloy having enriched Ni regions at the oxide interface comprising the steps of: formulating an electrochemical hydrogen storage alloy containing components that are preferentially corroded during activation; and activating said alloy to produce said enriched Ni regions.

A method of forming an electrochemical hydrogen storage alloy having enriched Ni regions at the oxide interface comprising the steps of: formulating a first electrochemical hydrogen storage alloy; formulating a second alloy containing components that are preferentially corroded during activation to leave enriched Ni regions; mechanically alloying said first alloy and said second alloy; and activating said mechanically alloyed first and second alloys.

An electrochemical hydrogen storage cell comprising: a negative electrode composed of a disordered electrochemical alloy having the following composition:

where said Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

DETAILED DESCRIPTION OF THE INVENTION

The disordered metal hydride alloy materials of the present invention are designed to have unusual two and three dimensional electronic configurations by varying the three dimensional interactions of constituent atoms and their various orbitals. Disorder in these alloys comes from compositional, positional, and translational relationships as well as disorder provided by the number, position, and size of crystallites of atoms that are not limited by conventional crystalline symmetry in their freedom to interact. This disorder can be of an atomic nature in the form of compositional or configurational disorder provided throughout the bulk or in numerous regions of the material. These disordered alloys have less order than the highly ordered crystalline structures which provide the single phase materials such as used for many of the electrode alloys of the prior art. The types of disordered structures which provide the local structural chemical environments for improved hydrogen storage characteristics in accordance with the present invention are multicomponent polycrystalline materials lacking long range compositional order; microcrystalline materials; amorphous materials having one or more phases; multiphase materials containing both amorphous and crystalline phases; or mixtures thereof.

The framework for disordered metal hydride alloys is a host matrix of one or more elements. The host elements are chosen in general to be hydride formers and can be lightweight elements. The host matrix elements can be, for example, based on either LaNi or TiNi. The host matrix elements are modified by incorporating selected modifier elements, which may or may not be hydride formers. The inventors have found through extensive analysis that regardless of the initial host matrix materials, when numerous modifier elements are introduced (such as those described in the present invention) the result is a disordered material that has superior electrochemical properties. The improvement in electrochemical properties is due to an increase in the number and spectrum of catalytically active, hydrogen storage sites. In particular, multi-orbital modifiers, for example transition elements, provide a greatly increased number of storage sites due to the various bonding configurations available. This results in an increase in energy density. Modification that results in a non-equilibrium material having a high degree of disorder provides unique bonding configurations, orbital overlap and hence a spectrum of bonding sites. Due to the different degrees of orbital overlap and the disordered structure, an insignificant amount of structural rearrangement occurs during charge/discharge cycles, or during rest periods, resulting in long cycle and shelf life.

The hydrogen storage and other electrochemical characteristics of the electrode materials of the present invention can be controllably altered depending on the type and quantity of host matrix material and modifier elements selected for making the negative electrode materials. The negative electrode alloys of the present invention are resistant to degradation by poisoning due to the increased number of selectively designed storage and catalytically active sites which also contribute to long cycle life. Also, some of the sites designed into the material can bond with and resist poisoning without affecting the active hydrogen sites. The materials thus formed have a very low self discharge and hence good shelf life.

Figure 1:
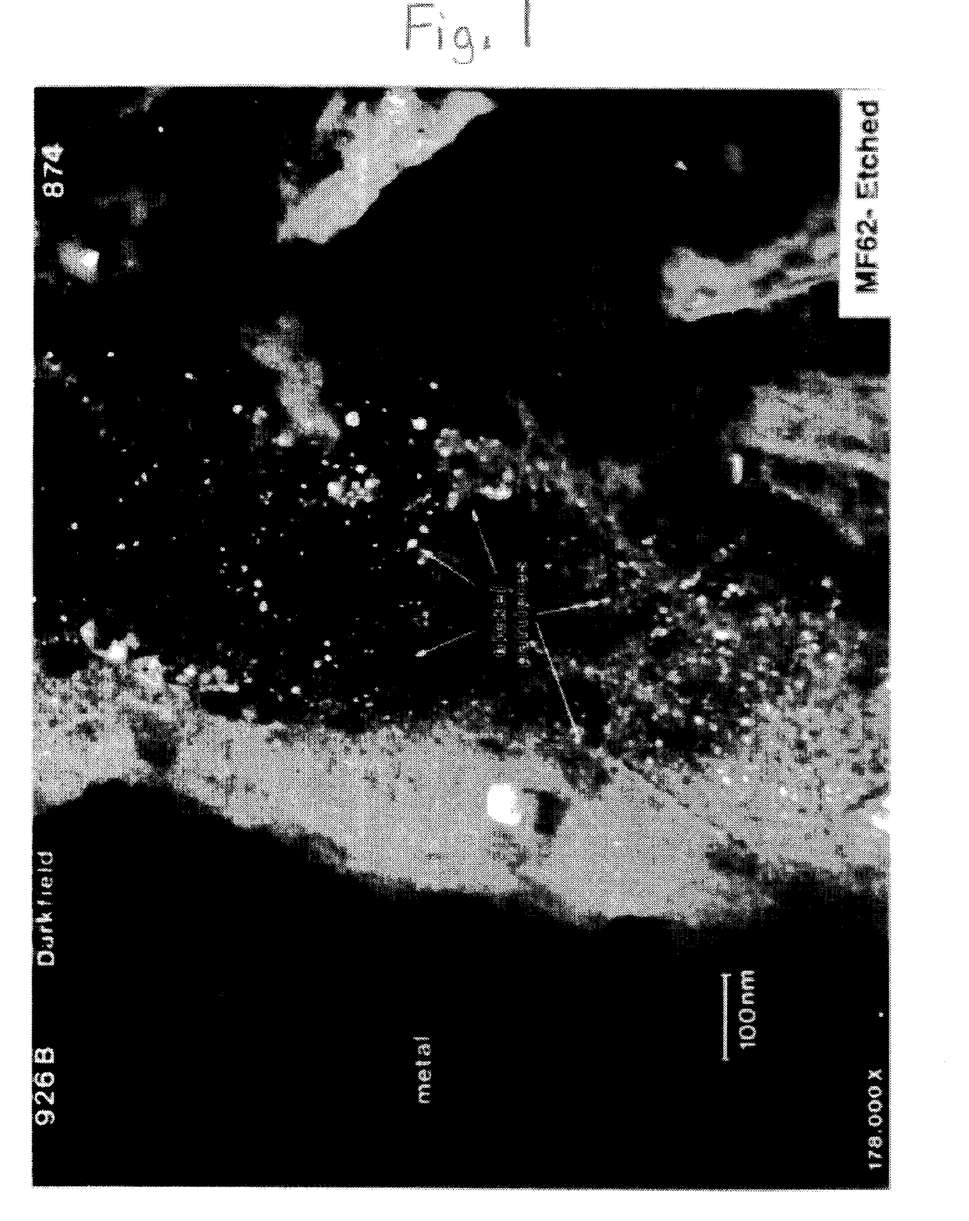
FIG. 1 shows enriched nickel regions at the oxide interface.

As discussed in U.S. Pat. No. 4,716,088 (the contents of which are specifically incorporated by reference) it is known that the steady state surface composition of V—Ti—Zr—Ni alloys can be characterized as having a relatively high concentration of metallic nickel. An aspect of the present invention is a significant increase in the frequency of occurrence of these nickel regions as well as a more pronounced localization of these regions. More specifically, the materials of the present invention have enriched nickel regions of 50–70 Å in diameter distributed throughout the oxide interface and varying in proximity from 2–300 Å, preferably 50–100 Å, from region to region. This is illustrated in the FIG. 1, where the nickel regions 1 are shown as what appear as grains on the surface of the oxide interface 2 at 178,000 X. As a result of the increase in the frequency of occurrence of these nickel regions, the materials of the present invention exhibit significantly increased catalysis and conductivity.

The increased density of Ni regions in the present invention provides powder particles having an enriched Ni surface. Prior to the present invention Ni enrichment was attempted unsuccessfully using microencapsulation. The method of Ni encapsulation results in the deposition of a layer of Ni about 100 Å thick at the metal-electrolyte interface. Such an amount is excessive and results in no improvement of performance characteristics.

The enriched Ni regions of the present invention can be produced via two general fabrication strategies:

1) Specifically formulate an alloy having a surface region that is preferentially corroded during activation to produce the described enriched Ni regions. Without wishing to be bound by theory, it is believed, for example, that Ni is in association with an element such as Al at specific surface regions and that this element corrodes preferentially during activation, leaving the enriched Ni regions described above. "Activation" as used herein specifically refers to "etching" or other methods of removing excessive oxides, such as described in U.S. Pat. No. 4,716,088, as applied to electrode alloy powder, the finished electrode, or at any point in between in order to improve the hydrogen transfer rate.

2) Mechanically alloy a secondary alloy to a hydride battery alloy, where the secondary alloy will preferentially corrode to leave enriched nickel regions. An example of such a secondary alloy is NiAl.

Alloys having enriched Ni regions can be formulated for every known type of hydride battery alloy system, including, but not limited to, Ovonic, TiVZrNi type, modified LaNi$_5$ type, mischmetal, and LaNi$_5$ alloys as well as the Mg alloys described in copending U.S. patent application Ser. No. 08/259,793.

More specific examples of hydride alloys that can be specifically formulated or mechanically alloyed with a secondary alloy as described in 1) and 2) above to produce enriched Ni regions are the following: Alloys represented by the formula $ZrMn_wV_xM_yNi_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$. Alloys corresponding substantially to the formula LaNi$_5$ in which one of the components La or Ni is substituted by a metal M selected from Groups Ia, II, III, IV, and Va of the Periodic Table of the Elements other than lanthanides, in an atomic proportion which is higher than 0.1% and lower than 25%. Alloys having the formula $TiV_{2-x}Ni_x$, where x=0.2 to 0.6. Alloys having the formula $Ti_aZr_bNi_cCr_dM_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.02$. Alloys having the formula $ZrMo_dNi_e$ where d=0.1 to 1.2 and e=1.1 to 2.5. Alloys having the formula $Ti_{1-x}Zr_xMn_{2-y-z}Cr_yV_z$ where $0.05 \leq x \leq 0.4$, $0 \leq y \leq 1.0$, and $0 \leq z \leq 0.4$. Alloys having the formula LnM$_5$ where Ln is at least one lanthanide metal and M is at least one metal chosen from the group consisting of Ni and Co. Alloys comprising at least one transition metal forming 40–75% by weight of the alloy chosen from Groups II, IV, and V of the Periodic System, and at least one additional metal, making up the balance of the alloy, alloyed with the at least one transitional metal, this additional metal chosen from the group consisting of Ni, Cu, Ag, Fe, and Cr—Ni steel. Alloys comprising a main texture of Mm—Ni system; and a plurality of compound phases where each compound phase is segregated in the main texture, and wherein the volume of each of the compound phases is less than about 10 μm$^3$.

The most preferred alloys having enriched Ni regions are allows having the following composition:

$(Base\ Alloy)_aCo_bMn_cFe_dSn_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

The production of the Ni regions of the present invention are consistent with a relatively high rate of removal through precipitation of the oxides of titanium and zirconium from the surface and a much lower rate of nickel solubilization, providing a degree of porosity to the surface. The resultant surface has a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

One important consideration in formulating the alloys of the present invention involves formulating specific alloys that have the proper balance of corrosion and passivation characteristics to form exceptional electrochemical alloys. According to the present invention, this process involves choosing modifiers from those set forth in Table 1, below.

TABLE 1

| I | II | III | IV |
|---|----|-----|-----|
| Ca | V | B | Cu |
| Be | Ti | Bi | Th |
| Y | Zr | In | Si |
|   | Cr | Sb | Zn |
|   | Al |    | Li |
|   | Fe |    | La |
|   | Sn |    | F |

In general, when added as modifiers the elements described in Table 1 make the following contributions to the final alloy mixture:

i) in group I, the elements alter corrosion as well as storage and bonding characteristics;

ii) in group II, V, Ti, and Zr alter bond strength and corrosion, and Cr, Al, Fe, and Sn alter corrosion, passivation, and catalysis;

iii) in group III, all the elements are glass formers and affect the formation of crystalline lattices; and iv) in group IV, Cu, Th, Si, Zn, Li, La, and F affect disorder and alter density of state.

As used herein, the term "Base Alloy" refers to a disordered alloy having a base alloy (as this term is described in U.S. Pat. No. 4,551,400) that is a disordered multicomponent alloy having at least one structure selected from the group consisting of amorphous, microcrystalline, polycrystalline, and any combination of these structures. The terms "amorphous," "microcrystalline," and "polycrystalline" are used as defined in U.S. Pat. No. 4,623,597, the contents of which are incorporated by reference. The alloys of the present invention are not limited to any particular structure. Preferably, the materials of the present invention are classified as having a disordered structure and encompass materials that have commonly been referred to by a variety of other terms such as AB,TiVZrNi type, modified LaNi$_5$, LaNi$_5$, mischmetal, C$_{14}$, C$_{15}$, Laves phase, etc.

More specific examples of Base Alloys are the following: An alloy represented by the formula $ZrMn_wV_xM_yNi_z$, where M is Fe or Co and w, x, y, and z are mole ratios of the respective elements where $0.4 \leq w < 0.8$, $0.1 \leq x \leq 0.3$, $0 \leq y < 0.2$, $1.0 \leq z \leq 1.5$, and $2.0 \leq w+x+y+z \leq 2.4$. An alloy corresponding substantially to the formula LaNi$_5$ in which one of the components La or Ni is substituted by a metal M selected from Groups Ia, II, III, IV, and Va of the Periodic Table of the Elements other than lanthanides, in an atomic proportion which is higher than 0.1% and lower than 25%. An alloy having the formula $TiV_{2-x}Ni_x$, where x=0.2 to 0.6. An alloy having the formula $Ti_aZr_bNi_cCr_dM_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$. An alloy having the formula $ZrMo_dNi_e$ where d=0.1 to 1.2 and e=1.1 to 2.5. An alloy having the formula $Ti_{1-x}Zr_xMn_{2-y-z}Cr_yV_z$ where $0.05 \leq x \leq 0.4$, $0 < y \leq 1.0$, and $0 < z \leq 0.4$. An alloy having the formula $LnM_5$ where Ln is at least one lanthanide metal and M is at least one metal chosen from the group consisting of Ni and Co. An alloy comprising at least one transition metal forming 40–75% by weight of the alloy chosen from Groups II, IV, and V of the Periodic System, and at least one additional metal, making up the balance of the alloy, alloyed with the at least one transitional metal, this additional metal chosen from the group consisting of Ni, Cu, Ag, Fe, and Cr—Ni steel. An alloy comprising a main texture of Mm—Ni system; and a plurality of compound phases where each compound phase is segregated in the main texture, and wherein the volume of each of the compound phases is less than about 10 $\mu m^3$.

The preferred formulations of the Base Alloy described in the present invention contain 0.1 to 60 atomic percent Ti, 0.1 to 40 atomic percent Zr, 0 to 60 atomic percent V, 0.1 to 57 atomic percent Ni, and 0 to 56 atomic percent Cr. The most preferred formulations of this Base Alloy contain 0.1 to 60 atomic percent Ti, 0.1 to 40 atomic percent Zr, 0.1 to 60 atomic percent V, 0.1 to 57 atomic percent N and 0 to 56 atomic percent Cr.

In general, the alloys of the present invention comprise negative electrodes for metal hydride cells that exhibit extremely high storage capacity and other significant quantitative improvements in their performance characteristics compared to prior art cells. Surprisingly, embodiments of the present invention show improvement in most, if not all, of their performance characteristics, and thus can be considered universal application cells.

In accordance with the present invention, it has been found that preferred alloys of the present invention described above and in the Summary of the Invention can be further classified as having a disordered microstructure where hydrogen in a particular phase is not easily discharged either through low surface area, or through an oxide of limited porosity or catalytic property. Specific examples of the alloys of the present invention are set forth in Table 2, below.

Alloy is modified by 12 to 17 atomic percent Mn. In addition, the affects of Mn can also be observed when the Base Alloy is modified by one of the following combinations:

(i) 6.5 to 7.5 atomic percent Co, 13 to 17 atomic percent Mn, and 0.5 to 2.5 atomic percent Fe;

(ii) 5.5 to 6.5 atomic percent Co, 13.5 to 14.5 atomic percent Mn, 1.5 to 2.5 atomic percent Al, and 0.25 to 1.0 atomic percent Fe;

(iii) 3.5 to 5.5 atomic percent Co, 14.5 to 15.5 atomic percent Mn, 0.5 to 2.5 Fe, and 0.2 to 1.0 Zn;

(iv) 3.5 to 5 atomic percent Co, 14.5 to 15.5 atomic percent Mn, 0.5 to 2.5 atomic percent Fe, and 0.2 to 1.0 atomic percent Sn.

Co has become one of the most widely used elements in rechargeable batteries. Because of its limited supply, Co has also become more costly to use. Recently, the price of Co has increased 5%. It is estimated that the price of Co will increase by as much as 30% by the year 2000. In response to these market forces, the inventors have successfully reduced the amount of Co necessary in alloys of the present invention so that the optimized alloys contain from 0–6 atomic % total Co. In particular, alloy No. 1, as set forth in Table 1, above, has been successfully used in prismatic electric vehicle batteries.

Though not wishing to be bound by theory, it is believed that in the alloys of the present invention, Mn alters the microstructure in such a way that the precipitation of phases having hydrogen bond strengths is outside of the range of electrochemical usefulness is inhibited. One way in which Mn appears to accomplishes this is by increasing the mutual solubility of the other elements within the primary phases during solidification. In addition, Mn functions at the electrochemically active surface oxide as a catalyst. The multiple oxidation states of Mn are believed to catalyze the electrochemical discharge reaction by increasing the porosity, conductivity, and surface area of the active surface oxide film. This results in a significant increase in storage capacity. (See, Table 4.)

In addition to increasing capacity, Mn has other effects such as enhanced low temperature performance, low cell pressure, and high cycle life. These effects are discussed in detail in U.S. Pat. No. 5,277,999, the contents of which are incorporated by reference.

Mn can also act as a replacement for Fe. Though not wishing to be bound by theory, it is believed that when Mn is present without Fe, Mn assists the electrochemical discharge reaction at low temperature by promoting bulk diffusion of hydrogen at low temperature and also by cata-

TABLE 2

| | |
|---|---|
| 1. $V_5Ti_9Zr_{27}Ni_{38}Cr_5Mn_{16}$ | 14. $V_4Ti_9Zr_{27}Ni_{37}Co_5Mn_{15}Fe_3Sn_{0.4}$ |
| 2. $V_5Ti_9Zr_{27}Ni_{38}Co_5Mn_{16}$ | 15. $V_3Ti_9Zr_{28}Ni_{37}Co_5Mn_{15}Fe_3Sn_{0.6}$ |
| 3. $V_5Ti_9Zr_{26}Ni_{38}Co_5Mn_{16}Fe_1$ | 16. $Ti_{10}Zr_{28}Ni_{36}Co_5Cr_5Mn_{16}$ |
| 4. $V_5Ti_9Zr_{26}Ni_{38}Co_5Mn_{15}Fe_2$ | 17. $Ti_{10}Zr_{27}Ni_{36}Co_5Cr_4Mn_{13}Fe_5$ |
| 5. $V_5Ti_9Zr_{26}Ni_{37}Co_5Mn_{15}Fe_3$ | 18. $Ti_{12}Zr_{29}Ni_{34}Co_5Cr_5Mn_{15}$ |
| 6. $V_5Ti_9Zr_{26}Ni_{36}Co_5Mn_{15}Fe_4$ | 19. $Ti_{13}Zr_{30}Ni_{34}Co_5Cr_3Mn_{15}$ |
| 7. $V_5Ti_9Zr_{26}Ni_{35}Co_5Mn_{15}Fe_5$ | 20. $Ti_{12}Zr_{29}Ni_{34}Co_7Cr_1Mn_{15}Fe_2$ |
| 8. $V_7Ti_9Zr_{24}Ni_{36}Co_5Mn_{16}Fe_3$ | 21. $V_1Ti_{10}Zr_{28}Ni_{34}Cr_3Co_6Mn_{14}Fe_2$ |
| 9. $V_6Ti_9Zr_{28}Ni_{35}Co_5Mn_{15}Fe_2$ | 22. $V_2Ti_{10}Zr_{26}Ni_{34}Cr_3Co_6Mn_{14}Fe_2Sn_1$ |
| 10. $V_4Ti_{10}Zr_{29}Ni_{35}Co_5Mn_{15}Fe_2$ | 23. $V_{0.2}Ti_{10}Zr_{28}Ni_{36}Co_5Cr_5Mn_{16}$ |
| 11. $V_4Ti_9Zr_{28}Ni_{37}Co_5Mn_{15}Fe_2Sn_{0.4}$ | 24. $V_{0.2}Ti_{12}Zr_{29}Ni_{34}Co_7Cr_1Mn_{15}Fe_2$ |
| 12. $V_3Ti_9Zr_{26}Ni_{38}Co_5Mn_{15}Fe_2Sn_{0.4}$ | 25. $V_{0.5}Ti_{10}Zr_{26}Ni_{34}Co_6Cr_3Mn_{14}Fe_2Sn_2$ |
| 13. $V_4Ti_9Zr_{27}Ni_{38}Co_5Mn_{15}Fe_2Sn_{0.4}$ | |

The affects of the addition of Mn can be seen in negative electrode materials of the present invention where the Base lyzing the reaction of hydrogen and hydroxyl ions at the alloy surface. Because of the low temperature properties of such alloys, it appears that Mn's catalytic properties are emphasized when Fe is not present, or at least present in only low concentrations.

Mn can also be substituted for Co. Though not wishing to be bound by theory, it is believed that in the alloys described above, Mn alters the microstructure and acts as a catalyst at the electrochemically active surface oxide.

The beneficial effects of Mn and Fe have also been detailed in U.S. Pat. Nos. 5,096,667, 5,104,617, and 5,238,756. The contents of all of these references are incorporated by reference.

It is noted in U.S. Pat. No. 5,104,617 that it was widely believed that the inclusion of Fe in metal hydride hydrogen storage alloy materials would deleteriously effect electrochemical performance. This belief was due to the knowledge that Fe readily oxidizes and corrodes, particularly in the presence of an alkaline electrolyte. Oxidation reduces the performance of a metal hydride electrode in many ways, and oxides of Fe were known in the prior art to adversely affect the nickel hydroxide positive electrode, particularly with respect to charging efficiency and thus capacity and cycle life.

Many of the alloys of the present invention involve Mn. The effects of the addition of Mn to these alloys is generally discussed in U.S. Pat. No. 5,096,667. The addition of Mn usually results in improved charging efficiency. Though not wishing to be bound by theory, this effect appears to result from Mn's ability to improve the charging efficiency of alloys it is added to by improving oxidation resistance and oxygen recombination. It has been observed that oxygen gas generated at the nickel hydroxide positive electrode recombined at the surface of the metal hydride electrode. Oxygen recombination is an especially aggressive oxidizer of its environment, even compared to the alkaline electrolyte.

It is possible that the modifier elements of the Base Alloy of the present invention, particularly Mn and Fe, and most particularly Co, either alone, or in combination with Mn and/or Al for example, act to catalyze oxygen reduction, thereby avoiding or reducing the oxidation of the surrounding elements in the metal hydride alloy. It is believed that this function of the modified alloys reduces or even eliminates the formation and build up of detrimental surface oxide, thereby providing a thinner and more stable surface.

While not wishing to be bound by theory, it is believed that several additional factors may explain the unexpected behavior of Mn and Fe in the Base Alloys of the present invention:

(1) The combination of Mn and excess Fe may affect the bulk alloy by inhibiting the bulk diffusion rate of hydrogen within the metal through the formation of complex phase structures, either by effecting the grain boundaries or by affecting the equilibrium bond strength of hydrogen within the metal. In other words, the temperature dependence of the hydrogen bond strength may be increased thereby decreasing the available voltage and capacity available under low temperature discharge.

(2) It is believed that the combination of Mn and excess Fe may result in a lower electrode surface area for metallurgical reasons by increasing the ductility of the alloy and thereby reducing the amount of surface area formation during the activation process.

(3) It is believed that the combination of Mn and excess Fe to these alloys may inhibit low temperature discharge through the alteration of the oxide layer itself with respect to conductivity, porosity, thickness, and/or catalytic activity. The oxide layer is an important factor in the discharge reaction and promotes the reaction of hydrogen from the Base Alloy of the present invention and hydroxyl ion from the electrolyte. We believe this reaction is promoted by a thin, conductive, porous oxide having some catalytic activity.

The combination of Mn and excess Fe does not appear to be a problem under room temperature discharge, but has shown a surprising tendency to retard the low temperature reaction. The formation of a complex oxide could result in a subtle change in oxide structure such as pore size distribution or porosity. Since the discharge reaction produces water at the metal hydride surface and within the oxide itself, a small pore size may be causing a slow diffusion of $K^+$ and $OH^-$ ions from the bulk of the electrolyte to the oxide. Under room temperature discharge where polarization is almost entirely ohmic to low temperature discharge where activation and concentration polarization components dominate the physical structure of the oxides with Fe and Mn compared to Mn alone could be substantially different.

Still another possible explanation is that the Mn and Fe have multivalent oxidation states. It is considered that some elements within the oxide may in fact change oxidation state during normal state of charge variance as a function of the rate of discharge and can be both temperature, fabrication, can compositionally dependant. It is possible these multiple oxidation states have different catalytic activity as well as different densities that together effect oxide porosity.

A possible problem with a complex oxide containing both Mn and excess Fe could be that the Fe component retards the ability of the Mn to change oxidation state if present in large quantities.

The function of Sn addition to the alloy is twofold. First, a small addition of Sn assists activation of the alloy as used in electrodes of the NiMh battery. Though not wishing to be bound by theory, this may be due to desirable corrosion during the initial heat treatment. Sn addition also has the desirable function of cost reduction, as Sn containing alloy allows the use of lower cost versions of Zirconium metal such as Zircalloy.

Throughout the preceding discussion with respect to the oxide it should be noted that the oxide also contains other components of the Base Alloy of the present invention, such as V, Ti, Zr, Ni, and/or Cr and other modifier elements. The discussion of a complex oxide of Mn and Fe is merely for the sake of brevity and one skilled in the art should not infer that the actual mechanism cannot also include a different or more complex explanation involving other such elements.

Negative electrodes using alloys of the present invention can be used in many types of hydrogen storage cells and batteries. These include fiat cells having a substantially fiat plate negative electrode, a separator, and a positive electrode or counter electrode that is substantially fiat and aligned to be in operative contact with the negative electrode; jelly-roll cells made by spirally winding a fiat cell about an axis; and prismatic cells for use in electric vehicles, for example. The metal hydride cells of the present invention can use any appropriate kind of container, and can be constructed, for example of metal or plastic.

A 30 weight percent aqueous solution of potassium hydroxide is a preferred electrolyte.

In a particularly preferred embodiment, alloys used in conjunction with advanced separator materials as disclosed in U.S. Pat. No. 5,330,861 yield improved performance over prior art alloys for certain electrochemical applications.

Besides the improved technical performance discussed above, alloy modification offers cost advantages of up to 30%. One of the dominant factors effecting base alloy cost is the cost of vanadium metal. In U.S. Pat. No. 5,002,730 incorporated by reference, vanadium in the form of V—Ni or V—Fe offers significant cost advantages over pure vanadium. Such cost improvements can be increased in the Base Alloys of the present invention through the use of V—Fe.

EXAMPLES

Preparation of Negative Electrode Materials

Alloy materials described in Table 2, above, and comparison materials described in Table 3 were prepared and fabricated as described below into negative electrode materials. The specific alloys used are referred to in the Tables of each specific Example. The numbering of the alloys is consistent throughout the application and refers to Table 2 or Table 3.

TABLE 3

COMPARISON MATERIALS

C1. $V_{22}Ti_{16}Zr_{16}Ni_{32}Cr_7Co_7$
C2. $V_{20.6}Ti_{15}Zr_{15}Ni_{30}Cr_{6.6}Co_{6.6}Mn_{3.6}Al_{2.7}$
C3. $V_{22}Ti_{16}Zr_{16}Ni_{39}Fe_7$
C4. $V_{22}Ti_{16}Zr_{16}Ni_{34}Co_7Fe_6$
C5. $V_{21}Ti_{15}Zr_{15}Ni_{31}Cr_6Co_6Fe_6$
C6. $V_{15}Ti_{15}Zr_{21}Ni_{31}Cr_6Co_6Fe_6$
C7. $V_{18}Ti_{15}Zr_{18}Ni_{31}Cr_6Co_6Fe_6$
C8. $V_{22}Ti_{11}Zr_{21}Ni_{39}Fe_7$
C9. $V_{18}Ti_{15}Zr_{18}Ni_{29}Cr_5Co_7Mn_8$

The alloys of Tables 2 and 3 were prepared by weighing and mixing starting materials of the component elements into a graphite crucible as described in U.S. Pat. Nos. 5,002,730 to Fetcenko and 4,948,423 to Fetcenko, et al. The crucible and its contents were placed in a vacuum furnace which was evacuated and then pressurized with approximately one atmosphere of argon. The crucible contents were melted by high frequency induction heating while under the argon atmosphere. The melting was carried out at a temperature of about 1500° C. until a uniform melt was obtained. At that time, the heating was terminated and the melt was allowed to solidify under an inert atmosphere blanket.

The ingot of alloy material was then reduced in size in a multi-step process. The first step involved a hydriding/dehydriding process substantially as described in U.S. Pat. No. 4,983,756 to Fetcenko, et al., entitled *Hydride Reactor Apparatus for Hydrogen Comminution of Metal Hydride Hydrogen Storage Alloy Material*, the disclosure of which is specifically incorporated by reference. In this first step, the alloy was reduced in size to less than 100 mesh. Subsequently, the material obtained from the hydriding/dehydriding process was further reduced in size by an impact milling process in which the particles were tangentially and radially accelerated against an impact block. This process is described in U.S. Pat. No. 4,915,898, entitled *Method for the Continuous Fabrication of Comminuted Hydrogen Storage Alloy Negative Electrode Material*, the disclosure of which is specifically incorporated by reference.

A fraction of the alloy material having a particle size of less than 200 mesh and a mass average particle size of about 400 mesh (38 microns) was recovered from the impact milling process and bonded to a nickel screen current collector by a process which involves disposing a layer of alloy material onto the current collector and compacting the powder and collector. Compacting was carried out under an inert atmosphere with two separate compaction steps, each at a pressure of about 16 tons per square inch. After compaction, the current collector and the powder adhered to it were sintered in an atmosphere of about 2 atomic percent hydrogen with the balance argon to form negative electrode materials. (In general, sintering may not be required in all applications. The necessity of sintering depends, of course, on the overall cell design and factors such as the state of charge balancing.

These alloys and negative electrodes were activated using the alkaline etch treatment described in U.S. Pat. No. 4,716,088, the disclosure of which is specifically incorporated by reference. As a practical matter some oxidation occurs during electrode fabrication, and thus, exposing the alloy powder or negative electrodes of the present invention to an alkaline solution to "etch" or alter the nature of the surface oxides that form yields a variety of beneficial results. For example, it is believed that etching alters the surface condition of the alloy powder or formed negative electrode material in such a way that improved charging efficiency is achieved on even the first charge cycle; promotes the ionic diffusion required for the electrochemical discharge process; creates an oxidation state gradient at the surface of the material; and alters the surface oxide to yield greater charge acceptance. As mentioned by Ogawa in Proceedings of the 1988 Power Sources Symposium, Chapter 26, *Metal Hydride Electrode for High Energy Density Sealed Nickel-Metal Hydride Battery* similar affects can be achieved by "etching" the alloy powder and then forming a negative electrode from this etched powder. See also, JPA 05/021 059 and JPA 05/013 077.

Preparation of Cells

Prepared negative electrodes were assembled with nickel hydroxide positive electrodes into sealed "C" cells having a resealable vent, as described in U.S. Pat. No. 4,822,377, using a 30% KOH electrolyte.

Example 1

Finished cells prepared as described above using the alloys set forth in Table 3, below, were subjected to charging and discharging conditions and the Energy Density (mAh/g) determined.

The data obtained from these tests are set forth in Table 4, below.

TABLE 4

| ENERGY DENSITY | |
|---|---|
| ALLOY | Energy Density (mAh/g) |
| C1 | 320 |
| C2 | 315 |
| C3 | 300 |
| C4 | 300 |
| C5 | 290 |
| C6 | 315 |
| C7 | 315 |
| C8 | 300 |
| 1 | 375 |
| 2 | 361 |
| 16 | 342 |
| 17 | 379 |

Example 2

Corrosion measurements were conducted using electrodes fabricated from the alloys listed in Table 5. These electrodes were prepared by cutting a thin (~1 mm thick) slice from an ingot of alloy material. A copper wire for electrical measurements was attached to one face of the slice using silver epoxy cement. The electrode was mounted in epoxy resin so that only the face on which the copper wire was attached was covered; the opposite face of the electrode was exposed. The exposed face was polished using 0.3 micron aluminum oxide paste and its geometric area determined for the corrosion measurements.

The corrosion potentials ($E_{corr}$) and corrosion currents ($i_{corr}$) of these electrodes were measured using an EG&G PARC corrosion measurement instrument. The measurements were conducted in 30% KOH solution. The corrosion potential of each electrode was determined by measuring the open circuit potential against a Hg/HgO reference electrode about 20 min after the electrode was dipped in solution. The corrosion currents was measured using the polarization resistance (linear polarization) technique. This technique was performed by applying a controlled potential scan of 0.1 mV/sec over a ±20 mV range with respect to $E_{corr}$. The resulting current was plotted linearly versus the potential. The slope of this potential current function $E_{corr}$ is the Polarization Resistance ($R_p$). $R_p$ was used together with the Tafel Constant β (assumed as 0.1 V/decade) to determine $i_{corr}$ using the formula $R_p = \beta_A \beta_c/(2.3 (i_{corr})(\beta_A+\beta_c))$

TABLE 5

| | CORROSION POTENTIALS | |
|---|---|---|
| Alloy | Series 1 $i_{corr} \times 10(uA/cm^2)$ | Series 2 $i_{corr} \times 10(uA/cm^2)$ |
| C9 | 5 | 8.7 |
| 1 | 3.3 | 3.5 |
| 16 | 1.7 | 1.0 |

In view of the above, it is obvious to those skilled in the art that the present invention identifies and encompasses a range of alloy compositions which, when incorporated as a negative electrode in metal hydride cells results in batteries having improved performance characteristics. The drawings, discussion, descriptions, and examples of this specification are merely illustrative of particular embodiments of the invention and are not meant as limitations upon its practice. It is the following claims, including all equivalents, that define the scope of the invention.

What is claimed is:

1. A disordered electrochemical hydrogen storage alloy comprising:

(Base Alloy)$_a$Co$_b$Mn$_c$Fe$_d$Sn$_e$ where said Base Alloy comprises 0.1 to 60 atomic percent Ti, 0.1 to 40 atomic percent Zr, 0 to 60 atomic percent V, 0.1 to 57 atomic percent Ni and 0 to 56 atomic percent Cr:

b is 0 to 7.5 atomic percent;

c is 13 to 17 atomic percent;

d is 0 to 3.5 atomic percent;

e is 0.2 to 1.0 atomic percent; and a+b+c+d+e=100 atomic percent.

2. The disordered electrochemical hydrogen storage alloy of claim 1, where c is 13 to 17 atomic percent;

b and d are equal to 0.

3. The disordered electrochemical hydrogen storage alloy of claim 1, where b is 4.5 to 7.5 atomic percent;

c is 12 to 17 atomic percent; and d is 0.5 to 5.5 atomic percent.

4. The disordered electrochemical hydrogen storage alloy of claim 1, where b is 0.5 to 7.0 atomic percent;

c is 12.0 to 14.5 atomic percent; and d is 0.5 to 2.5.

5. The disordered electrochemical hydrogen storage alloy of claim 2, where there is no functional amount of Cr present.

6. The disordered electrochemical hydrogen storage alloy of claim 2, where there is 0.5 to 7.5 atomic percent of Cr present.

7. The disordered electrochemical hydrogen storage alloy of claim 2, where there is no functional amount of Co present.

8. The disordered electrochemical hydrogen storage alloy of claim 1, wherein said alloy comprises a disordered microstructure where hydrogen in a particular phase is not easily discharged either through low surface area or through an oxide of limited porosity or catalytic property.

9. The disordered electrochemical hydrogen storage alloy of claim 1, wherein said alloy has a composition chosen from the group consisting of:

| | |
|---|---|
| $V_5Ti_9Zr_{27}Ni_{38}Cr_5Mn_{16}$ | $V_4Ti_9Zr_{27}Ni_{37}Co_5Mn_{15}Fe_3Sn_{0.4}$ |
| $V_5Ti_9Zr_{27}Ni_{38}Co_5Mn_{16}$ | $V_3Ti_9Zr_{28}Ni_{37}Co_5Mn_{15}Fe_3Sn_{0.6}$ |
| $V_5Ti_9Zr_{26}Ni_{38}Co_5Mn_{16}Fe_1$ | $Ti_{10}Zr_{28}Ni_{36}Co_5Cr_5Mn_{16}$ |
| $V_5Ti_9Zr_{26}Ni_{38}Co_5Mn_{15}Fe_2$ | $Ti_{10}Zr_{27}Ni_{36}Co_5Cr_4Mn_{13}Fe_5$ |
| $V_5Ti_9Zr_{26}Ni_{37}Co_5Mn_{15}Fe_3$ | $Ti_{12}Zr_{29}Ni_{34}Co_5Cr_5Mn_{15}$ |
| $V_5Ti_9Zr_{26}Ni_{36}Co_5Mn_{15}Fe_4$ | $Ti_{13}Zr_{30}Ni_{34}Co_5Cr_3Mn_{15}$ |
| $V_5Ti_9Zr_{26}Ni_{35}Co_5Mn_{15}Fe_5$ | $Ti_{12}Zr_{29}Ni_{34}Co_7Cr_1Mn_{15}Fe_2$ |
| | [April 10, 1995] |
| $V_7Ti_9Zr_{24}Ni_{36}Co_5Mn_{16}Fe_3$ | $V_1Ti_{10}Zr_{28}Ni_{34}Cr_3Co_6Mn_{14}Fe_2$ |
| $V_6Ti_9Zr_{28}Ni_{35}Co_5Mn_{15}Fe_2$ | $V_2Ti_{10}Zr_{26}Ni_{34}Cr_3Co_6Mn_{14}Fe_2Sn_1$ |
| $V_4Ti_{10}Zr_{29}Ni_{35}Co_5Mn_{15}Fe_2$ | $V_{0.2}Ti_{10}Zr_{28}Ni_{36}Co_5Cr_5Mn_{16}$ |
| $V_4Ti_9Zr_{28}Ni_{37}Co_5Mn_{15}Fe_2Sn_{0.4}$ | $V_{0.2}Ti_{12}Zr_{29}Ni_{34}Co_7Cr_1Mn_{15}Fe_2$ |
| $V_3Ti_9Zr_{26}Ni_{38}Co_5Mn_{15}Fe_2Sn_{0.4}$ | $V_{0.5}Ti_{10}Zr_{26}Ni_{34}Co_6Cr_3Mn_{14}Fe_2Sn_2$ |
| $V_4Ti_9Zr_{27}Ni_{38}Co_5Mn_{15}Fe_2Sn_{0.4}$ | |

10. The disordered electrochemical hydrogen storage alloy of claim 1, wherein said alloy has the following composition:

$V_5Ti_9Zr_{27}Ni_{38}Cr_5Mn_{16}$.

11. An electrochemical hydrogen storage alloy having an enriched Ni alloy surface at the oxide interface where said enriched Ni alloy surface comprises enriched nickel regions of 50–70 Å in diameter distributed throughout the oxide interface.

12. The electrochemical hydrogen storage alloy of claim 11, where said enriched Ni regions vary in proximity from 2 to 300 Å from region to region.

13. The electrochemical hydrogen storage alloy of claim 11, where said enriched Ni regions vary in proximity from 50 to 100 Å, from region to region.

14. The disordered electrochemical hydrogen storage alloy of claim 1, wherein said alloy has an enriched Ni alloy surface.

15. The disordered electrochemical hydrogen storage alloy of claim 14, where said enriched Ni alloy surface comprises enriched nickel regions of 50–70 Å in diameter distributed throughout the oxide interface.

16. The disordered electrochemical hydrogen storage alloy of claim 15, where said enriched Ni regions vary in proximity from 2 to 300 Å from region to region.

17. The disordered electrochemical hydrogen storage alloy of claim 15, where said enriched Ni regions vary in proximity from 50 to 100 Å, from region to region.

18. A method of forming an electrochemical hydrogen storage alloy having enriched Ni regions at the oxide interface comprising the steps of:

formulating an electrochemical hydrogen storage alloy containing components that are preferentially corroded during activation; and activating said alloy to produce said enriched Ni regions; where said enriched Ni regions are 50–70 Å in diameter and distributed throughout the oxide interface.

19. The method of forming an electrochemical hydrogen storage alloy of claim 18, where said electrochemical hydrogen storage alloy is classified as a TiVZrNi type, modified LaNi$_5$ type, LaNi$_5$, mischmetal, or Mg based alloy.

20. The method of forming an electrochemical hydrogen storage alloy of claim 18, where said electrochemical hydrogen storage alloy is chosen from the group consisting of:

alloys represented by the formula ZrMn$_w$V$_x$M$_y$Ni$_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$;

alloys corresponding substantially to the formula LaNi$_5$ in which one of the components La or Ni is substituted by a metal M selected from Groups Ia, II, III, IV, and Va of the Periodic Table of the Elements other than lanthanides, in an atomic proportion which is higher than 0.1% and lower than 25%;

alloys having the formula TiV$_{2-x}$Ni$_x$, where x=0.2 to 0.6;

alloys having the formula Ti$_a$Zr$_b$Ni$_c$Cr$_d$M$_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$;

alloys having the formula ZrMo$_d$Ni$_e$ where d=0.1 to 1.2 and e=1.1 to 2.5;

alloys having the formula Ti$_{1-x}$Zr$_x$Mn$_{2-y-z}$Cr$_y$V$_z$ where $0.05 \leq x \leq 0.4$, $0 \leq y \leq 1.0$, and $0 < z \leq 0.4$;

alloys having the formula LnM$_5$ where Ln is at least one lanthanide metal and M is at least one metal chosen from the group consisting of Ni and Co;

alloys comprising at least one transition metal forming 40–75% by weight of said alloys chosen from Groups II, IV, and V of the Periodic System, and at least one additional metal, making up the balance of said electrochemical hydrogen storage alloy, alloyed with the at least one transitional metal, this additional metal chosen from the group consisting of Ni, Cu, Ag, Fe, and Cr—Ni steel; and alloys comprising a main texture of an Mm—Ni system; and a plurality of compound phases where each compound phase is segregated in the main texture, and wherein the volume of each of the compound phases is less than about 10 μm$^3$.

21. The method of forming an electrochemical hydrogen storage alloy of claim 18, where said electrochemical hydrogen storage alloy is a disordered electrochemical hydrogen storage alloy comprising:

(Base Alloy)$_a$Co$_b$Mn$_c$Fe$_d$Sn$_e$ where said Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr;

b is 0 to 7.5 atomic percent;

c is 13 to 17 atomic percent;

d is 0 to 3.5 atomic percent;

e is 0 to 1.5 atomic percent; and a+b+c+d+e=100 atomic percent.

22. A method of forming an electrochemical hydrogen storage alloy having enriched Ni regions at the oxide interface comprising the steps of:

formulating a first electrochemical hydrogen storage alloy;

formulating a second alloy containing components that are preferentially corroded during activation to leave enriched Ni regions;

mechanically alloying said first alloy and said second alloy; and activating said mechanically alloyed first and second alloys.

23. The method of forming an electrochemical hydrogen storage alloy of claim 22, where said first electrochemical hydrogen storage alloy is classified as a TiVZrNi type, modified LaNi$_5$ type, LaNi$_5$, mischmetal or Mg based alloy.

24. The method of forming an electrochemical hydrogen storage alloy of claim 22, where said first electrochemical hydrogen storage alloy is chosen from the group consisting of:

alloys represented by the formula ZrMn$_w$V$_x$M$_y$Ni$_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$;

alloys corresponding substantially to the formula LaNi$_5$ in which one of the components La or Ni is substituted by a metal M selected from Groups Ia, II, III, IV, and Va of the Periodic Table of the Elements other than lanthanides, in an atomic proportion which is higher than 0.1% and lower than 25%;

alloys having the formula TiV$_{2-x}$Ni$_x$, where x=0.2 to 0.6;

alloys having the formula Ti$_a$Zr$_b$Ni$_c$Cr$_d$M$_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$;

alloys having the formula ZnMo$_d$Ni$_e$ where d=0.1 to 1.2 and e=1.1 to 2.5;

alloys having the formula Ti$_{1-x}$Zr$_x$Mn$_{2-y-z}$Cr$_y$V$_z$ where $0.05 \leq x \leq 0.4$, $0 \leq y \leq 1.0$, and $0 < z \leq 0.4$;

alloys having the formula LnM$_5$ where Ln is at least one lanthanide metal and M is at least one metal chosen from the group consisting of Ni and Co;

alloys comprising at least one transition metal forming 40–75% by weight of said alloys chosen from Groups II, IV, and V of the Periodic System, and at least one additional metal, making up the balance of said electrochemical hydrogen storage alloy, alloyed with the at least one transitional metal, this additional metal chosen from the group consisting of Ni, Cu, Ag, Fe, and Cr—Ni steel; and alloys comprising a main texture of an Mm—Ni system; and a plurality of compound phases where each compound phase is segregated in the main texture, and wherein the volume of each of the compound phases is less than about 10 μm³.

25. The method of forming an electrochemical hydrogen storage alloy of claim 22, where said first electrochemical hydrogen storage alloy is a disordered electrochemical hydrogen storage alloy comprising:

$$(\text{Base Alloy})_a\text{Co}_b\text{Mn}_c\text{Fe}_d\text{Sn}_e$$

where
said Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr;
b is 0 to 7.5 atomic percent;
c is 13 to 17 atomic percent;
d is 0 to 3.5 atomic percent;
e is 0 to 1.5 atomic percent; and
a+b+c+d+e=100 atomic percent.

26. An electrochemical hydrogen storage cell comprising:
a negative electrode composed of a disordered electrochemical alloy having the following composition:

$$(\text{Base Alloy})_a\text{Co}_b\text{Mn}_c\text{Fe}_d\text{Sn}_e$$

where
said Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr;
b is 0 to 7.5 atomic percent;
c is 13 to 17 atomic percent;
d is 0 to 3.5 atomic percent;
e is 0.2 to 1.0 to 1.5 atomic percent; and
a+b+c+d+e=100 atomic percent.

27. The electrochemical hydrogen storage cell of claim 26, where in said disordered electrochemical alloy
c is 13 to 17 atomic percent;
b and d are equal to 0.

28. The electrochemical hydrogen storage cell of claim 26, where in said disordered electrochemical alloy
b is 4.5 to 7.5 atomic percent;
c is 12 to 17 atomic percent; and
d is 0.5 to 5,5 atomic percent.

29. The electrochemical hydrogen storage cell of claim 26, where in said disordered electrochemical alloy
b is 0.5 to 7.0 atomic percent;
c is 12.0 to 14.5 atomic percent; and
d is 0.5 to 2.5.

30. The electrochemical hydrogen storage cell of claim 27, where said disordered electrochemical alloy contains no functional amount of Cr.

31. The electrochemical hydrogen storage cell of claim 27, where said disordered electrochemical alloy contains 0.5 to 7.5 atomic percent of Cr.

32. The electrochemical hydrogen storage cell of claim 27, where said disordered electrochemical alloy contains is no functional amount of Co.

33. The electrochemical hydrogen storage cell of claim 26, wherein said disordered electrochemical alloy has a disordered microstructure where hydrogen in a particular phase is not easily discharged either through low surface area or through an oxide of limited porosity or catalytic properly.

34. The electrochemical hydrogen storage cell of claim 26, wherein said a disordered electrochemical alloy has a composition chosen from the group consisting of:

| | |
|---|---|
| $V_5Ti_9Zr_{27}Ni_{38}Cr_5Mn_{16}$ | $V_4Ti_9Zr_{27}Ni_{37}Co_5Mn_{15}Fe_3Sn_{0.4}$ |
| $V_5Ti_9Zr_{27}Ni_{38}Co_5Mn_{16}$ | $V_3Ti_9Zr_{28}Ni_{37}Co_5Mn_{15}Fe_3Sn_{0.6}$ |
| $V_5Ti_9Zr_{26}Ni_{38}Co_5Mn_{16}Fe_1$ | $Ti_{10}Zr_{28}Ni_{36}Co_5Cr_5Mn_{16}$ |
| $V_5Ti_9Zr_{26}Ni_{38}Co_5Mn_{15}Fe_2$ | $Ti_{10}Zr_{27}Ni_{36}Co_5Cr_4Mn_{13}Fe_5$ |
| $V_5Ti_9Zr_{26}Ni_{37}Co_5Mn_{15}Fe_3$ | $Ti_{12}Zr_{29}Ni_{34}Co_5Cr_5Mn_{15}$ |
| $V_5Ti_9Zr_{26}Ni_{36}Co_5Mn_{15}Fe_4$ | $Ti_{13}Zr_{30}Ni_{34}Co_5Cr_3Mn_{15}$ |
| $V_5Ti_9Zr_{26}Ni_{35}Co_5Mn_{15}Fe_5$ | $Ti_{12}Zr_{29}Ni_{34}Co_7Cr_1Mn_{15}Fe_2$ |
| $V_7Ti_9Zr_{24}Ni_{36}Co_5Mn_{16}Fe_3$ | $V_1Ti_{10}Zr_{28}Ni_{34}Cr_3Co_6Mn_{14}Fe_2$ |
| $V_6Ti_9Zr_{28}Ni_{35}Co_5Mn_{15}Fe_2$ | $V_2Ti_{10}Zr_{26}Ni_{34}Cr_3Co_6Mn_{14}Fe_2Sn_1$ |
| $V_4Ti_{10}Zr_{29}Ni_{35}Co_5Mn_{15}Fe_2$ | $V_{0.2}Ti_{10}Zr_{28}Ni_{36}Co_5Cr_5Mn_{16}$ |
| $V_4Ti_9Zr_{28}Ni_{37}Co_5Mn_{15}Fe_2Sn_{0.4}$ | $V_{0.2}Ti_{12}Zr_{29}Ni_{34}Co_7Cr_1Mn_{15}Fe_2$ |
| $V_3Ti_9Zr_{26}Ni_{38}Co_5Mn_{15}Fe_2Sn_{0.4}$ | $V_{0.5}Ti_{10}Zr_{26}Ni_{34}Co_6Cr_3Mn_{14}Fe_2Sn_2$ |
| $V_4Ti_9Zr_{27}Ni_{38}Co_5Mn_{15}Fe_2Sn_{0.4}$ | |

35. The electrochemical hydrogen storage cell of claim 26, wherein said disordered electrochemical alloy has the following composition:

$$V_5Ti_9Zr_{27}Ni_{38}Cr_5Mn_{16}$$

36. An electrochemical hydrogen storage alloy having enriched Ni regions at the oxide interface comprising:
a first electrochemical hydrogen storage alloy;
a second alloy mechanically alloyed to said first electrochemical hydrogen storage alloy;
where said second alloys contains components that are preferentially corroded during activation to leave enriched Ni regions.

37. The electrochemical hydrogen storage alloy of claim 36, where said first electrochemical hydrogen storage alloy is classified a TiVZrNi type, modified LaNi₅ type, LaNi₅, mischmetal, or Mg based alloy.

38. The electrochemical hydrogen storage alloy of claim 36, where said second alloy is chosen from the group consisting of:
alloys represented by the formula $ZrMn_wV_xM_yNi_z$, where M Is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$;
alloys corresponding substantially to the formula LaNi₅ in which one of the components La or Ni is substituted by a metal M selected from Groups Ia, II, III, IV, and Va of the Periodic Table of the Elements other than lanthanides, in an atomic proportion which is higher than 0.1% and lower than 25%;

alloys having the formula $TiV_{2-x}Ni_x$, where x=0.2 to 0.6;

alloys having the formula $Ti_aZr_bNi_cCr_dM_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$;

alloys having the formula $ZrMo_dNi_e$ where d=0.1 to 1.2 and e=1.1 to 2.5;

alloys having the formula $Ti_{1-x}Zr_xMn_{2-y-z}Cr_yV_z$ where $0.05 \leq x \leq 0.4$, $0 < y \leq 1.0$, and $0 < z \leq 0.4$;

alloys having the formula $LnM_5$ where Ln is at least one lanthanide metal and M is at least one metal chosen from the group consisting of Ni and Co;

alloys comprising at least one transition metal forming 40–75% by weight of said alloys chosen from Groups II, IV, and V of the Periodic System, and at least one additional metal, making up the balance of said electrochemical hydrogen storage alloy, alloyed with the at least one transitional metal, this additional metal chosen from the group consisting of Ni, Cu. Ag, Fe, and Cr—NI steel; and alloys comprising a main texture of an Mm—Ni system; and a plurality of compound phases where each compound phase is segregated in the main texture, and wherein the volume of each of the compound phases is less than about 10 μm³.

39. The method of forming an electrochemical hydrogen storage alloy of claim 36, where said first electrochemical hydrogen storage alloy is a disordered electrochemical hydrogen storage alloy comprising:

(Base Alloy)$_a$Co$_b$Mn$_c$Fe$_d$Sn$_e$ where said Base Alloy comprises 0.1 to 60 atomic percent Ti, 0.1 to 40 atomic percent Zr, 0 to 60 atomic percent V, 0.1 to 57 atomic percent Ni and 0 to 56 atomic percent Cr.

b is 0 to 7.5 atomic percent:

c is 13 to 17 atomic percent;

d is 0 to 3.5 atomic percent;

e is 0 to 1.5 atomic percent; and a+b+c+d+e=100 atomic percent.

40. A method of forming an electrochemical hydrogen storage alloy having enriched Ni regions at the oxide interface comprising the steps of:

formulating a first electrochemical hydrogen storage alloy;

formulating a second alloy;

mechanically alloying said first alloy and said second alloy; and activating said mechanically alloyed first and second alloys.

41. The method of forming an electrochemical hydrogen storage alloy of claim 40, where said first electrochemical hydrogen storage alloy is classified as a TiVZrNi type modified LaNi$_5$ type, LaNi$_5$, mischmetal, or Mg based alloy.

42. The method of forming an electrochemical hydrogen storage alloy of claim 40, where said first electrochemical hydrogen storage alloy is chosen from the group consisting of:

alloys represented by the formula $ZrMn_wV_xM_yNi_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z < 1.5$, and $2.0 \leq w+x+y+z \leq 2.4$;

alloys corresponding substantially to the formula $LaNi_5$ in which one of the components La or NI is substituted by a metal M selected from Groups Ia, II, III, IV and Va of the Periodic Table of the Elements other than lanthanides, in an atomic proportion which is higher than 0.1% and lower than 25%;

alloys having the formula $TiV_{2-x}Ni_x$, where x=0.2 to 0.6;

alloys having the formula $Ti_aZr_bNi_cCr_dM_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$;

alloys having the formula $ZrMo_dNi_e$ where d=0.1 to 1.2 and e=1.1 to 2.5;

alloys having the formula $Ti_{1-x}Zr_xMn_{2-y-z}Cr_yV_z$ where $0.05 \leq x \leq 0.4$, $0 < y \leq 1.0$, and $0 < z \leq 0.4$;

alloys having the formula $LnM_5$ where Ln is at least one lanthanide metal and M is at least one metal chosen from the group consisting of Ni and Co;

alloys comprising at least one transition metal forming 40–75% by weight of said alloys chosen from Groups II, IV, and v of the Periodic System, and at least one additional metal making up the balance of said electrochemical hydrogen storage alloy, alloyed with the at least one transitional metal, this additional metal chosen from the group consisting Of Ni, Cu, Ag, Fe, and Cr—Ni steel; and alloys comprising a main texture of an Mm—Ni system; and a plurality of compound phases where each compound phase is segregated in the main texture, and wherein the volume of each of the compound phases is less than about 10 μm³.

43. The method of forming an electrochemical hydrogen storage alloy of claim 40, where said first electrochemical hydrogen storage alloy is a disordered electrochemical hydrogen storage alloy comprising:

(Base Alloy)$_a$Co$_b$Mn$_c$Fe$_d$Sn$_e$ where said Base Alloy comprises 0.1 to 60 atomic percent TI, 0.1 to 40 atomic percent Zr, 0 to 60 atomic percent V.0.1 to 57 atomic percent Ni, and 0 to 56 atomic percent Cr;

b is 0 to 7.5 atomic percent;

c is 13 to 17 atomic percent;

d is 0 to 3.5 atomic percent;

e is 0 to 1.5 atomic percent; and a+b+c+d+e=100 atomic percent.

* * * * *